Jan. 29, 1963 W. A. WILLIAMS 3,075,613
LUBRICATING PUMP FOR VARIABLE STROKE MECHANISMS
Filed Aug. 2, 1960 2 Sheets-Sheet 1
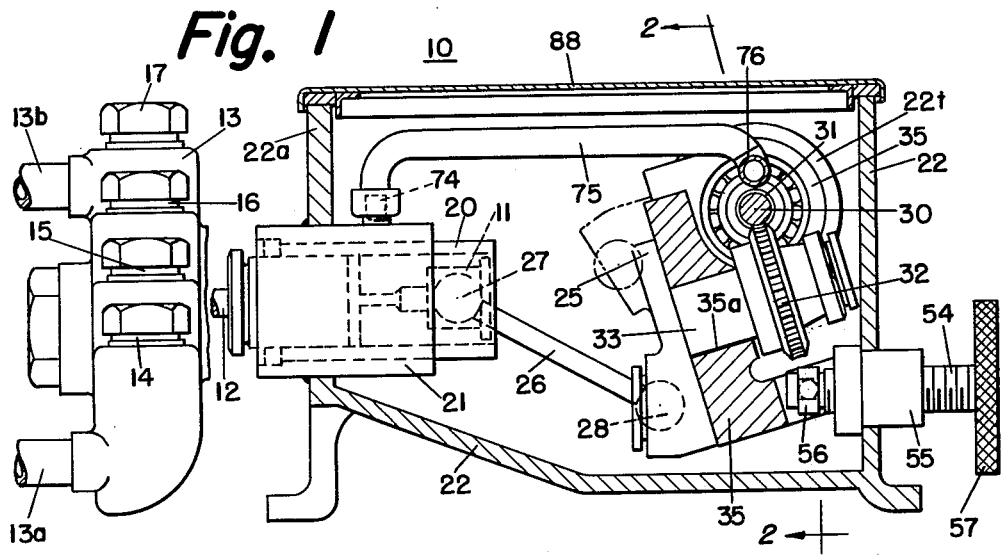
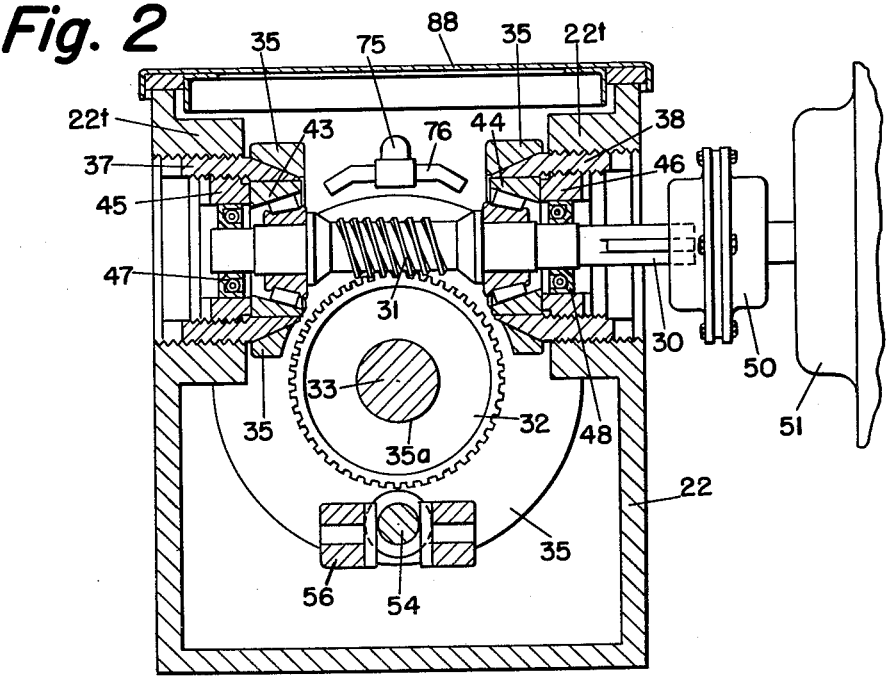

United States Patent Office 3,075,613
Patented Jan. 29, 1963

3,075,613
LUBRICATING PUMP FOR VARIABLE
STROKE MECHANISMS
William A. Williams, Philadelphia, Pa., assignor to Milton
Roy Company, St. Petersburg, Fla., a corporation of
Pennsylvania
Filed Aug. 2, 1960, Ser. No. 47,037
6 Claims. (Cl. 184—6)

This invention relates to a lubricating pump and has for an object the provision of a lubricating pump incorporated in the crosshead of a controlled volume pump for providing positive lubrication for the bearing connections of a connecting link between the crosshead and variable stroke mechanism.

In Saalfrank patent, 2,892,352, there is disclosed a variable stroke mechanism of the type having a driving connection, such as a link, connected at one end to a crosshead or other member to be reciprocated and at the opposite end to a crank having an axis and rotation extending in the same general direction as the path of movement of the crosshead. The crank is supported on a pivotally mounted sub-frame adjustable to change the inclination of the axis of rotation of the crank and thus the stroke of the crosshead. The opposite ends of the link are connected to the crosshead and the crank by spherical bearing members which are adapted to operate in a bath of lubricating oil contained within the closed housing for the mechanism. While such lubricating arrangement for the spherical bearing members has been satisfactory for many applications, nevertheless it has been a limiting factor on the pressure at which the pump may operate. For satisfactory bearing lubrication, it is well understood that there should be provided means for reformation of an oil film between the mating surfaces of the bearing. To accomplish this in the arrangement of the aforesaid patent, it is necessary that the spherical balls be lifted from their spherical seats. When the controlled volume pump is operating under high suction head conditions, the thrust load on the crosshead is always acting to keep the bearings seated and thus preventing the reformation of an oil film between the ball and bearing even though the parts are submerged in an oil bath. It is an object of the present invention to provide positive lubrication for such bearings and to insure that the spherical balls are lifted from their spherical seats when the pump is operating under high suction conditions.

It is a further object of the invention to provide a lubricating pump for discharging oil on the return stroke of the main pump so that the thrust created by the lubricating pump acts against the suction head thrust and at the same time the oil pressure acting on the ends of the balls lifts the balls out of their seats and insures the formation of a thick oil film during each cycle of the pump.

In carrying out the present invention in one form thereof, there is provided a connecting link forming a driving connection between a crosshead or other member to be reciprocated and variable stroke drive means therefor. The connecting link is provided with a pair of bearing means connected respectively with the drive means and the crosshead. A flow passage for bearing lubricant extends to each of the bearing means. There is also provided pumping means having suction and pressure strokes and reciprocated with the crosshead. The pumping means is connected with a supply of the lubricant on the suction stroke and with the flow passage on the pressure stroke to provide positive lubrication of the bearing means during each cycle of operation of the crosshead.

Further in accordance with the invention, and more specifically, the pumping means for the lubricant is formed by providing both the crosshead and the bearings therefor with two diameters so that when the crosshead moves forward, an annular space is formed between the crosshead and its bearing surface in the housing for the variable stroke pump mechanism. A flow passage extends through the connecting rod, the opposite ends of which are provided with spherical bearings connected respectively to the crosshead and to the crank of the variable stroke mechanism. When the crosshead moves forward, lubricating oil is sucked from the crankcase of the housing through a check valve into the annular space formed between the crosshead and its bearing. On the return stroke of the crosshead, the oil is forced first to the back of the crosshead spherical bearing, and then through the hollow connecting rod to the back of the crank spherical bearing. A relief valve is provided to limit the pressure developed on the lubricant pumping means to a value which will balance the suction head of the main pump.

The present invention has numerous advantages particularly in connection with controlled volume pumps. For example, by providing positive or forced lubrication for the bearings, the load for the pump can be increased approximately four to five times over that which the pump can handle without positive lubrication. Variable stroke pump mechanisms of the type disclosed in the aforesaid Patent 2,892,352 may be readily converted to the positive lubrication arrangement disclosed in the present application. Moreover, the positive lubrication arrangement of the present invention provides lubrication of the gear box as well as the thrust bearings of the variable stroke mechanism enabling the more expensive roller bearings to be eliminated.

For further objects and advantages of the invention, and for a more detailed understanding thereof, reference is to be had to the following description taken in conjunction with the accompanying drawings in which:

FIG. 1 is a sectional elevation view of the controlled volume pump embodying the present invention;

FIG. 2 is a sectional elevation view taken along the lines 2—2 in FIG. 1; and

Figure 3:
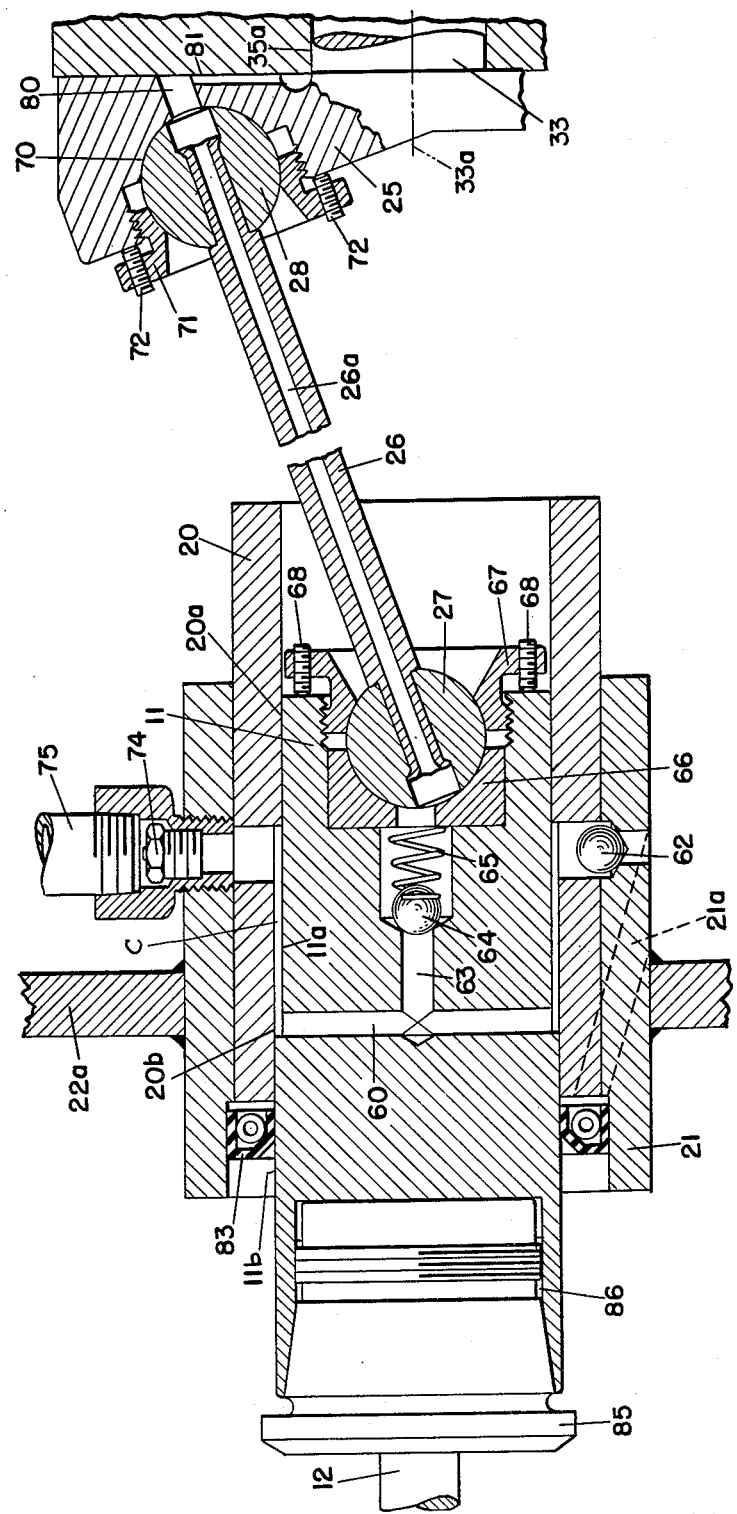
FIG. 3 is an enlarged fractional view of FIG. 1, with the crank revolved 180°.

Referring to FIG. 1, the invention has been illustrated in connection with a stroke adjustment mechanism 10 for controlling the length of stroke of crosshead 11 which drives a pump plunger 12 within a displacement chamber located internally of a pump body and valve assembly 13, preferably of the type shown in Salfrank Patent No. 2,898,867. The pump body and valve assembly 13 has an inlet connection 13a, an outlet connection 13b, two inlet valves 14 and 15 and two outlet valves 16 and 17. It is to be understood that other types of pump body and valve assemblies may be employed, such for example as described in the aforesaid Patent 2,892,352.

The crosshead 11 is adapted to reciprocate within a bearing sleeve 20 disposed within a tubular support 21 which in turn extends through the forward wall 22a of a housing or frame 22, the lower portion of which provides a crankcase for a supply of lubricating oil. The crosshead 11 is adapted to be reciprocated by a variable stroke drive means including a crank 25. The crosshead 11 and crank 25 are interconnected by means of a connecting link 26 the opposite ends of which are provided with ball members 27 and 28 to provide bearing connections respectively with the crosshead 11 and the crank 25. As later to be described in connection with FIG. 3 the crosshead 11 includes provisions for pumping lubricant from the crankcase through a flow passage extending axially of the connecting link 26 to provide positive lubrication for the ball members 27 and 28.

As may be seen in FIG. 1, there is provided a rotatable drive shaft 30 having thereon a gear in the form of a worm 31 which meshes with and rotates a driven worm gear 32 secured to a driven shaft 33. The crank 25 is secured to one end of the driven shaft 33. When the variable stroke mechanism is positioned for zero stroke of the crosshead 11, the axis 33a of the shaft 33 is coaxial with the path of the movement of the crosshead 11, as shown in FIG. 3.

The shaft 33 is journalled in a straight bearing 35a, FIGS. 1 and 3, of a sub-frame or gear box 35 which is itself rotatably mounted, FIG. 2, on the mating tapered ends of sleeve members 37 and 38. The opposite ends of sleeve members 37 and 38 are provided with external threads which are adapted to be received by cooperating internal threads provided on tubular projections 22 to extending through the opposite side walls of the housing 22. The sleeves or trunnions 37 and 38 are adapted to receive the antifriction bearings 43 and 44 which support the drive shaft 30 for rotation. The inner surface of the sleeve members 37 and 38 are threaded to receive bearing thrust collars 45 and 46 which in turn receive shaft seals 47 and 48 which surround the drive shaft 30. The drive shaft 30 is provided with a coupling 50 for connecting the drive shaft 30 to a suitable drive motor 51. The sub-frame or casting 35 is rotatable about the axis of drive shaft 30 by means of a stroke adjustment screw 54, FIG. 1. The stroke adjustment screw 54 extends through a threaded sleeve 55 which projects through one of the side walls of the housing 22. The inner end of the screw 54 is connected at 56 to the lower end of the sub-frame 35 while the outer end of the adjusting screw 54 is provided with an adjusting knob 57. The adjusting means maintains the sub-frame 35 in the required position for the selected stroke. In FIG. 1, the stroke adjustment screw 54 has been adjusted for substantially maximum stroke.

Referring to FIG. 3, it will be seen that the crosshead 11 is provided with two different diameters, 11a and 11b. The crosshead bearing 20 is also provided with two different diameters, 20a and 20b. The cooperating cylindrical surfaces 11a and 20b of different diameters form an annular space of increasing size between the crosshead and the crosshead bearing as the crosshead 11 moves forward. This annular space or chamber C connects with a passage 60 extending transversely through the crosshead 11. As crosshead 11 moves forward, a suction is created in the annular chamber C and lubricating oil is drawn up from the crankcase through the check valve 62 into the annular chamber and into the passage 60. It will be noted that the vertical passage 60 communicates with an axial passage 63, the opposite end of which is sealed by a ball member 64 held against its seat by means of a spring 65. On the return stroke of the crosshead 11, i.e. the suction stroke of the pump plunger 12, the volume of chamber C is reduced and the oil drawn into the annular chamber C is forced through passage 60 into passage 63 and past the valve 64 to the spherical bearing 66 for the ball member 27 on one end of connecting rod 26. The ball 27 is held against the spherical bearing 66 by means of a retaining cap 67 which is threadedly received in the rear end of the crosshead 11. The retaining cap 67 is maintained in place by means of lock screws 68 which engage the end of the crosshead 11. The oil is then forced through a flow passage 26a extending axially of the connecting rod 26 to the back of the crank spherical bearing 70 which engages the ball member 28 on the opposite end of the connecting rod 26. The ball member 28 is held against the crank spherical bearing 70 by means of a retaining cap 71 which threadedly engages the crank 25 and is provided with set screw 72 for locking the retaining cap in position. A pressure relief valve 74 is provided to limit the pressure developed by the crosshead lubricating pump to a reasonable value.

It will be particularly noted that the pressure stroke for the lubricating pump is on the return stroke of the main pump which includes plunger 12. At this time the drive motor 51 is under minimum load and thus the load which is added by the lubricating pump does not affect the motor size required for the main pumping operation. If the lubricating pump discharged on the pressure stroke of the main pump, then their loads would be additive, requiring an increased size of motor. However, the principal reason for discharging the lubricating oil on a return stroke of the main pump is to insure that the spherical balls 27 and 28 are lifted from their spherical seats under all operating conditions. This is particularly important when the pump is operating under high suction head conditions where the thrust load on the crosshead is always acting to keep the bearings seated and thus prevent the reformation of an oil film between the balls and the spherical bearings. In accordance with the present invention, the thrust created by the lubricating pump acts against the suction head thrust to balance the pressure and at the same time the oil pressure acting on the ends of the balls 27 and 28 lift the balls out of their seats and insures the formation of a thick oil film during each cycle of the main pump.

In the present invention the pressure relief valve 74 is set at a value sufficiently high to overcome the thrust of the high suction head and thus the pressure of the oil in the crosshead chamber C acts to balance the thrust from the suction head and this enables the spherical balls 27 and 28 to be lifted from their seats and allow the reformation of an oil film between the ball members and their bearing surfaces. The oil passing through the relief valve 74 is directed by way of a pipe 75, FIG. 1, to a transversely extending pipe 76, the opposite ends of which are adapted to communicate with the bearing surfaces of sub-frame 35 which engage the tapered outer ends of sleeves 37 and 38, FIG. 2.

It is usually undesirable to have two or more bearings supplied from the same lubricating pump because if one bearing can lift from its seat ahead of the other and in this way reduce the incoming oil pressure, the second bearing never becomes properly lubricated. However, with the spherical bearings of the present invention, the retaining caps 67 and 71 serve as check valves against all leakage from the bearings even when the balls 27 and 28 are lifted from their seats. In the same manner the balls 27 and 28 serve as check valves for the lubricating pump, thus preventing oil or air from going back into the annular chamber.

The crosshead lubricating pump in the present invention is not only adapted to lubricate the ball members 27 and 28 and their spherical bearing surfaces, but is also adapted to lubricate the bearing surfaces between the crank 25 and the sub-frame 35. In FIG. 3 it will be noted that the crank 25 is provided with a passage 80 which is adapted to communicate with the recessed portion 81 forming a chamber with the adjacent surface of the subframe member 35. Lubricating oil passes through the passage 80 and into the chamber 81 providing lubrication between the adjacent surfaces of the crank 25 and the sub-frame 35. Lubricating oil then passes between the shaft 33 and the bearing surface 35a of the sub-frame member 35 to provide lubrication therefor.

The crosshead 11 may project into a catchall adjacent the forward wall 22a if desired. A seal 83 extends around the circumference of the crosshead 11 and cooperates with an inclined passage 21a extending through member 21 to return any excess lubricating oil on the crosshead to the crankcase. The plunger 12 for the controlled volume pump is mounted on the forward end of the crosshead 11 by means of a threaded member 85 which acts as a collet in cooperating with a threaded recess 86 in the forward end of crosshead 11 for retaining the plunger 12 on the crosshead. The threaded members 85 and 86 preferably are locked together by means of a liquid material sold under the trademark "Loktite." This material includes an epoxy resin base which hardens when brought into contact with the metal and is sufficiently strong to hold the two threaded members together. This construction provides a relatively inexpensive arrangement for mounting the plunger 12 on the crosshead. The housing 22 is provided with a cover 88 to provide a tightly enclosed construction for the variable stroke mechanism.

From the foregoing it will be seen that the present invention provides a lubricating pump relatively simple and of inexpensive construction for providing positive lubrication of the bearings of the variable stroke mechanism of a controlled volume pump so as to enable the latter to handle pressures four or five times greater than heretofore possible without pressure lubrication.

While a preferred embodiment of the invention has been described and illustrated, it is to be understood that modifications thereof may be made within the scope of the appended claims.

What is claimed is:

1. A method of providing positive lubrication for the bearings of a link connecting a crosshead with a reciprocable stroke mechanism comprising creating suction in a variable volume chamber during the forward stroke of the crosshead to suck lubricant into the chamber, compressing the lubricant in the variable volume chamber during the return stroke of the crosshead and utilizing the pressure of the lubricant in the variable volume chamber to create a force on the crosshead in a direction opposite to the movement of the crosshead and a reaction force against a stationary member to separate the bearing surfaces which are in contact during the forward stroke, and concurrently forcing the lubricant under pressure from the variable volume chamber into the bearing connections between the link and the crosshead and the stroke mechanism to provide positive formation of a lubricant film between the mating surfaces of the bearing connections during each cycle of operation of the crosshead.

2. A method of providing positive lubrication for the bearings of a link connecting a pump plunger crosshead with a variable stroke mechanism comprising creating suction in a variable volume chamber during the discharge stroke of the pump plunger to suck lubricant into the chamber, compressing the lubricant in the variable volume chamber during the suction stroke of the pump plunger, limiting the maximum pressure of the lubricant in the variable volume chamber to a value sufficient to overcome the thrust of the suction head pressure on the pump plunger, utilizing the pressure of the lubricant in the variable volume chamber to create a force on the crosshead in a direction opposite to the movement of the crosshead and a reaction force against a stationary member to balance the suction head pressure on the plunger and separate the bearing surfaces which are in contact during the pressure stroke, and concurrently forcing the lubricant under pressure from the variable volume chamber into the bearing connections between the link and the crosshead and the variable stroke mechanism to provide positive formation of a lubricant film between the mating surfaces of the bearing connections during each cycle of operation of the pump plunger.

3. In a reciprocable pump mechanism, the improvement comprising a crosshead, a crosshead bearing supporting said crosshead for reciprocation therein, a pump plunger carried at one end of said crosshead, a pump body having a displacement chamber within which said pump plunger is reciprocated, drive means, a connecting link having bearing connections respectively with said drive means and the other end of said crosshead, said link having a flow passage therethrough to said bearing connections, said crosshead and said crosshead bearing each having two different diameters to form a variable volume annular chamber adjacent said other end of said crosshead to which said link is connected, an inlet passage for lubricant extending through said crosshead bearing and communicating with said variable volume annular chamber, valve means in said inlet passage preventing return flow of lubricant from said variable volume annular chamber during the suction stroke of said pump plunger, an outlet passage for lubricant in said crosshead, said outlet passage communicating with said variable volume annular chamber and with said flow passage through said link, and valve means in said outlet passage preventing return flow of lubricant from said bearing connections, the volume of said annular chamber on the discharge stroke of the pump plunger being increased and the volume of said annular chamber being decreased on the suction stroke of the pump plunger so as to draw lubricant into said annular chamber from a lubricant supply on said pump discharge stroke and to force the lubricant from said chamber through said outlet passage on said pump suction stroke, whereby the pressure of the lubricant in the variable volume annular chamber creates a force on the crosshead in a direction opposite to the movement of the crosshead and a reaction force against the crosshead bearing to separate the bearing surfaces which are in contact during the pressure stroke and to provide positive formation of a lubricant film between the mating surfaces of the bearing connections during each cycle of operation of said crosshead.

4. In a reciprocable pump mechanism according to claim 3 wherein said drive means includes means to vary the length of stroke of said crosshead, and adjustable pressure relief valve means associated with said variable volume annular chamber.

5. In a reciprocable stroke mechanism, the improvement comprising a crosshead, a crosshead bearing supporting said crosshead for reciprocation therein, drive means, a connecting link having bearing connections respectively with said drive means and one end of said crosshead, said link having a flow passage therethrough to said bearing connections, said crosshead and said crosshead bearing each having two different diameters to form a variable volume annular chamber adjacent the end of said crosshead to which said link is connected, an inlet passage for lubrication extending through said crosshead bearing and communicating with said variable volume annular chamber, valve means in said inlet passage preventing return flow of lubricant from said variable volume annular chamber, an outlet passage for lubrication in said crosshead, said outlet passage communicating with said variable volume annular chamber and with said flow passage through said link, and valve means in said outlet passage preventing return flow of lubricant from said bearing connections.

6. In a reciprocable stroke mechanism, the improvement comprising a crosshead, a crosshead bearing supporting said crosshead for reciprocation therein, variable stroke drive means, a connecting link having bearing connections respectively with said drive means and one end of said crosshead, said link having a flow passage therethrough to said bearing connections, said crosshead and said crosshead bearing each having two different diameters to form a variable volume annular chamber adjacent the end of said crosshead to which said link is connected, an inlet passage for lubrication extending through said crosshead bearing and communicating with said variable volume annular chamber, valve means in said inlet passage preventing return flow of lubricant from said variable volume annular chamber, an outlet passage for lubrication in said crosshead, said outlet passage communicating with said variable volume annular chamber and with said flow passage through said link, valve means in said outlet passage preventing return flow of lubricant from said bearing connections, and valve means for controlling the maximum pressure of the lubricant within said variable volume annular chamber.

References Cited in the file of this patent

UNITED STATES PATENTS

| | | |
|---|---|---|
| 459,349 | Jakobson | Sept. 8, 1891 |
| 673,282 | Myers | Apr. 30, 1901 |
| 1,378,621 | Sabin | May 17, 1921 |
| 2,250,512 | Vickers | July 29, 1941 |
| 2,629,639 | Johansen | Feb. 24, 1953 |
| 2,884,093 | Stewart | Apr. 28, 1959 |
| 2,892,352 | Saalfrank | June 30, 1959 |
| 2,899,016 | Swayze | Aug. 11, 1959 |

FOREIGN PATENTS

| | | |
|---|---|---|
| 1,107,223 | France | Aug. 3, 1955 |